June 6, 1967        A. A. AYKANIAN        3,324,210
METHOD OF FOAMING A PREDETERMINED SURFACE
AREA ON A PLASTIC ARTICLE
Filed June 24, 1964        2 Sheets-Sheet 1
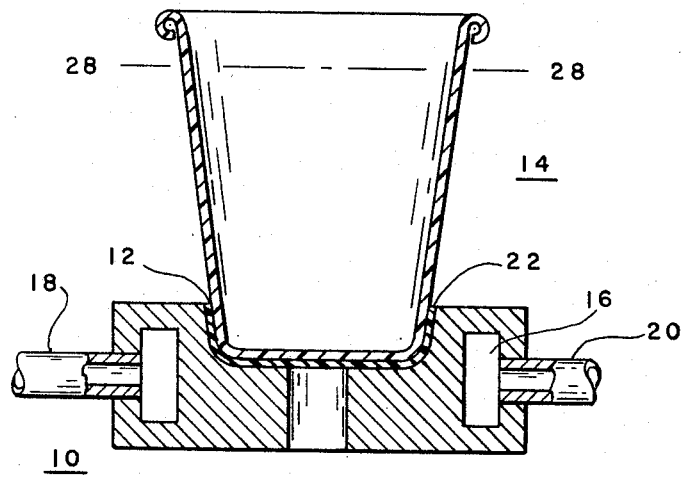
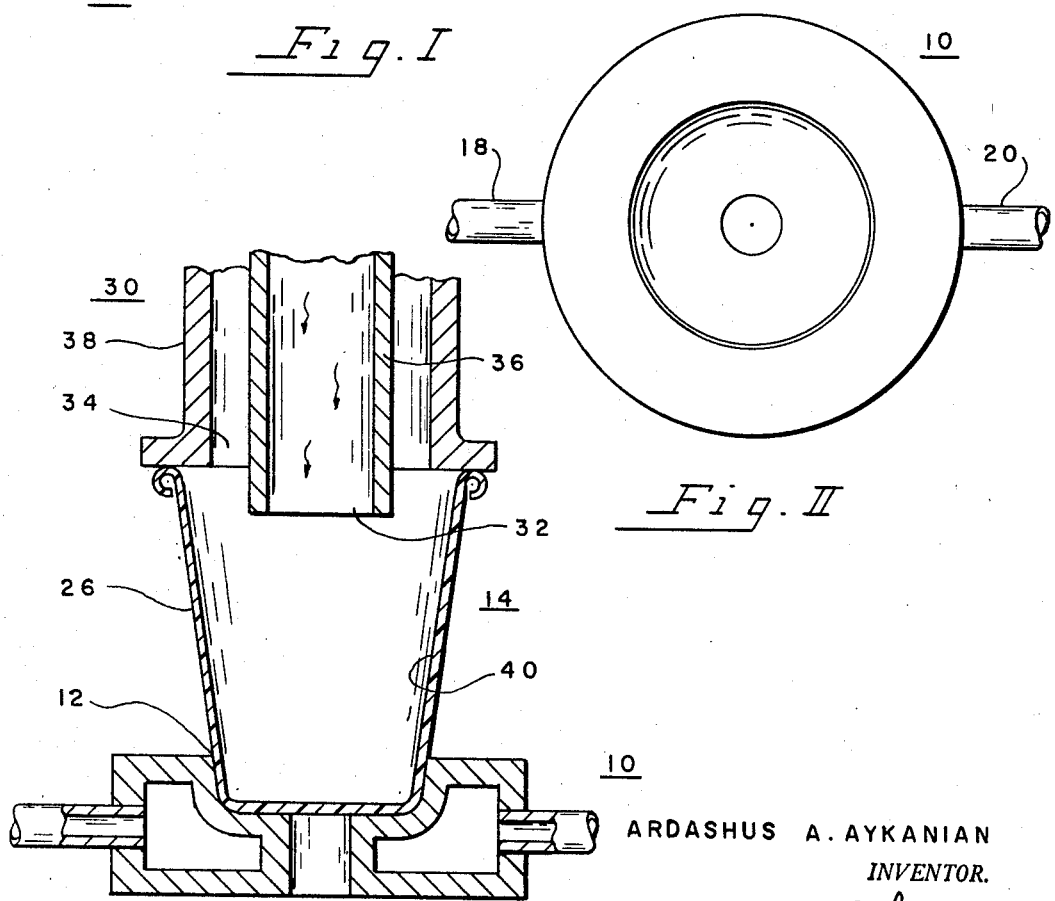
ARDASHUS A. AYKANIAN
*INVENTOR.*
BY James C. Logomasini
ATTORNEY.

June 6, 1967  A. A. AYKANIAN  3,324,210
METHOD OF FOAMING A PREDETERMINED SURFACE
AREA ON A PLASTIC ARTICLE
Filed June 24, 1964  2 Sheets-Sheet 2
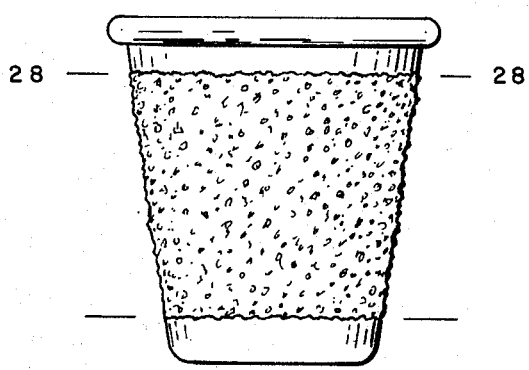
Fig. IV
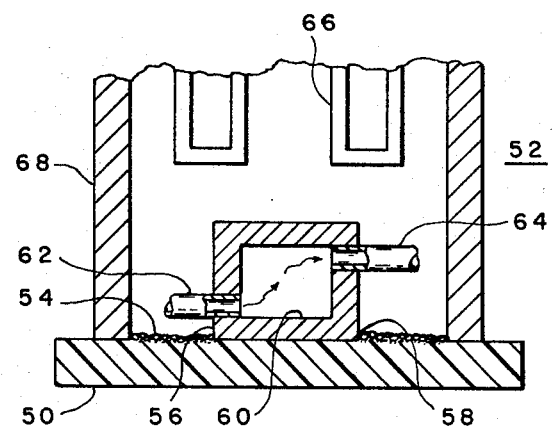
Fig. V
ARDASHUS A. AYKANIAN  INVENTOR.
BY James C. Logomasini
ATTORNEY.

United States Patent Office 3,324,210
Patented June 6, 1967

3,324,210
METHOD OF FOAMING A PREDETERMINED
SURFACE AREA ON A PLASTIC ARTICLE
Ardashus A. Aykanian, Wilbraham, Mass., assignor to
Monsanto Company, St. Louis, Mo., a corporation of
Delaware
Filed June 24, 1964, Ser. No. 377,554
7 Claims. (Cl. 264—45)

The present invention relates to plastic articles of manufacture and more particularly to plastic articles of manufacture having insulating surfaces.

It is well known in the art that plastic foams can be made by incorporating a blowing agent or liberating gas material into a thermoplastic resin and subsequently raising the temperature of the resin. This causes the blowing agent to convert from a solid or liquid state to a gaseous state thereby expanding the resin to produce cellular structures. The resulting foamed resin is of a much lighter density than the original resin and generally possesses greatly increased sound dampening and heat insulating properties.

In spite of the advantages gained by foaming plastic resins, the use of these foamed materials has been limited for many purposes because of the comparatively poor structural strengths of the final fabricated articles. To minimize this problem, various methods for supporting the foamed resin have been devised, most of which involved adhering or bonding solid or rigid members to the foam. However, these structures are generally difficult and expensive to construct and are sometimes limited in their application depending on the effectiveness of the bonding operation and the difficulty of preserving the foam intact.

In U.S. Patent No. 3,262,625, filed Apr. 12, 1963, there is described the formation of plastic articles which combine the insulating characteristics of foamed resin and the structural stability and strength of non-foamed plastic. In brief, these plastic articles are produced by steeping a plastic article in a medium which is absorbable by the plastic for a predetermined interval of time, removing the plastic article from the medium and finally heating the plastic article to produce a foamed cover. In this manner, plastic articles such as containers, conduits, etc. are obtained which have good insulating and structural characteristics. Unfortunately, serious problems have been encountered when attempting to control the extent of the area or surface on the plastic article to be foamed. This is primarily due to the difficulty of controlling the area extent of medium contact with the plastic article particularly at high speed production operations.

Accordingly, it is a principal object of the present invention to foam predetermined surface areas on plastic articles.

Another object of the present invention is to foam predetermined surface areas on plastic articles at high speed production rates.

A further object of the present invention is to control the extent of the foamed surface area on plastic articles which is produced by exposing the surface to a medium which is absorbable by the plastic and subsequently heating the surface.

A further object of this invention is to provide method and means to attain the preceding objects.

Other objects of this invention will in part be obvious and will in part appear hereinafter.

These and other objects are attained by exposing a surface of a plastic article to a medium which is absorbable by the plastic, applying a cooled surface against a designated portion of the exposed plastic surface and subjecting the plastic article to a source of heat. The medium which is absorbable by the plastic is considered to be any material which is (1) absorbable by the plastic being processed and (2) convertible to a gaseous state at a temperature below the melting point temperature of the plastic.

The following drawings are provided for the purpose of illustrating various embodiments of the present invention.

FIGURE I is a side view, partly in section and with parts broken, illustrating an embodiment of the present invention whereby a ring or circular structure having a cooled internal annular surface is applied against the lower portion of a container.

FIGURE II is a top plan view with parts broken further illustrating the ring shown in FIGURE I.

FIGURE III is a side view, partly in section and with parts broken, illustrating the container shown in FIGURE I positioned against a heating device.

FIGURE IV is a side view of a container that has been partially foamed utilizing the cooled ring illustrated in FIGURES I and III.

FIGURE V is a side view, partly in section and with parts broken, illustrating the method of controlling the extent of surface foaming on an article other than a container.

Referring in detail to the figures of the drawings and more specifically FIGURE I, there is schematically shown an internally cooled circular structure or ring 10 having a cooled annular surface 12 which is applied against the lower portion of the plastic container 14. The plastic container 14 is a container that has had a portion of its outer surface exposed to a volatile medium which resulted in some of the medium being absorbed into the plastic. The ring 10 is provided internally with an annular passageway 16 for circulating a cooling medium. In this embodiment, the cooling medium, which may be a gas or liquid, enters the annular passageway 16 through nozzle 18 and exits through nozzle 20. The cooling medium has been previously reduced in temperature by cooling means not shown. Although a liquid or gas may be employed as the cooling means, a liquid is generally preferred.

Sometimes there is a tendency for the plastic to adhere slightly to the cooled surface particularly if the plastic is heated to any great extent. Consequently, it is sometimes desirable to cover the cooled surface with a film which will inhibit the tendency of the plastic to adhere to the cooled surface. In the embodiment shown in FIGURE I, a very thin lining 22 of Teflon (polytetrafluoroethylene) has been placed over the cooler surface 12 of the ring 10. The use of a Teflon lining is optional, however, and it is obvious that any material other than Teflon may also be used if it will reduce the tendency of the plastic to stick to the cooled surface during the heating operation described below.

The operation can be described by reference to FIGURE III. The plastic container 14 shown in FIGURE III has had its outer surface 26 immersed in a volatile liquid medium which resulted in some of the medium being absorbed into the plastic up to a level indicated by the dashed line 28—28. As illustrated in FIGURE I, the ring 10 is positioned against the container 14 such that the cooled surface 12 abuts the lower portion of the container. The surface 12 of the ring 10 is cooled by a fluid such as water, oil, etc. circulating through the annular passageway 16. To prevent the container 14 from sticking to the cooled surface 12, a Teflon liner 22 is affixed to the ring between the cooled surface 12 and the container. After the ring has been positioned as described, a heating device 30 is placed in contact with the open rim of the cup 14 as shown in FIGURE III. The heating device 30 has an inlet 32 and an outlet 34 for circulating a fluid which has been previously heated to elevated temperatures. Inlet 32 is at the end of a conduit 36 which is positioned concentrically within an outer discharge conduit 38.

During this stage of the operation as illustrated in FIGURE III, a fluid heated to an elevated temperature flows from the concentric conduit 36 and circulates within the container before discharge along the outer discharge conduit 38. The circulation of the heating fluid within the plastic container 14 results in a heat transfer from the fluid to the inner walls 40 of the container causing a further heat transfer or flow across the body or wall of the plastic. This flow of heat causes that portion of the outer surface 26, with the exception of the surface of the cup abutting the cooled annular surface 12, previously exposed to the volatile medium to foam. Consequently, the portion of the cup surface in contact with the cooled annular surface is inhibited from foaming even though this portion had also been exposed to the volatile medium. FIGURE IV illustrates the container 14 after the ring 10 and the heating device 30 have been removed.

FIGURE V illustrates the use of the present invention to partially foam plastic articles other than containers. For example, FIGURE V discloses a plastic slab or panel 50 in contact with a heating device 52 for the purpose of foaming the upper or abutting surface 54 of the plastic panel 50 which surface has previously absorbed a volatile medium. In contact with surface of the plastic panel 40 is a casing 56 provided with a cooled surface 58 and a passageway 60 for the circulation of a cooling medium through partially shown inlet and outlet nozzles 62 and 64 respectively. In this embodiment, the cooling device and the heating device are parts of an integral unit and both devices are being applied to the same side of the plastic article. Aside from these differences, the operation is similar to that described previously for the embodiment shown in FIGURE III. In other words, a gas heated to an elevated temperature flows from the concentric conduit 66 and circulates within the area enclosed by the plastic panel 50 and the outer casing 68 of the heating device 52 during which time a cooled fluid circulates through the passageway 60 of the bar 58. In this manner, foaming of the surface 54 of the plastic panel 50 occurs at all portions enclosed by the outermost casing 68 except that portion in contact with the cooled surface 58.

The above description and particularly the drawings are set forth for purposes of illustration and not for the purpose of limitation. Any cooling means having a cooled surface may be employed which can be used in the manner described to inhibit the surface foaming of a plastic article during the heating operation. The configuration of the cooled surface will depend on (1) the shape of the plastic article which is to be partially foamed and (2) the extent of the surface area on the plastic article which is to be inhibited from foaming. Consequently, the shape of the cooled surface will vary in accordance with the plastic product to be produced. The temperature of the cooled surface will vary somewhat depending on the type of plastic being heated, the volatility of the medium and the heating temperature. In general, however, the temperature of the cooled surface will be below the temperature at which the medium will convert from a solid or liquid state to a gaseous state. If the medium is a liquid, the temperature at which it converts to a gaseous state is its boiling point. In general, it is preferred that the temperature of the cooled surface be at least 5° F. below the temperature at which the medium converts to a gaseous state.

The material of construction of the cooled surface may be of any type which is considered temperature conductive as normally understood in the art. For this reason, metal is preferred over most other materials. Suitable materials would include steel, aluminum, copper and various nickel alloys. If a Teflon or other type lining is used, its thickness will generally depend on its temperature conducting properties. The lower the temperature conducting property, the thinner the film or lining should be. For fluorocarbons such as polytetrafluoroethylene (Teflon) and polytrifluorochloroethylene (Kel-F), lining thickness in the order of 0.1 to 2.0 mils are preferred. The use of linings is optional, although it has been found that a Teflon or Kel-F lining reduces the tendency of the plastic to stick to the cooled surface during the heating operation. This effect tends to become serious where extremely high production rates are desired. Although linings composed of fluorocarbons such as polytetrafluoroethylene (Teflon) and polytrifluorochloroethylene (Kel-F), are preferred primarily because of their good self-lubricating and wearing properties, other linings may be used which will accomplish the same purpose.

In brief, the present invention utilizes a cooled surface to control the area of foaming during a partial foaming operation which comprises partially immersing the plastic article in a medium which is absorbable by the plastic and then applying the cooled surface and heat in accordance with the practice of this invention to selectively foam portions of the plastic surface which were immersed. As previously mentioned, the overall process is described in detail in U.S. Patent No. 3,262,625, Ser. No. 272,540, filed Apr. 12, 1963. More specifically, the overall process as described in this patent involve shaping a solid plastic form, steeping the plastic form in a medium which is absorbable by the plastic for a predetermined interval of time, removing the plastic form from the medium and finally heating the plastic form to produce a foamed covering at all or portions of the surface area which had been in contact with the absorbable medium. In the practice of the present invention, a cooled surface is utilized in a unique manner which results in selective foaming of plastic articles. As previously indicated, the temperature of the cooled surface and the heating temperature used to foam the plastic article will vary depending on the type of plastic being foamed and the type of volatile medium used in the process. An example employing these variables is given to illustrate the invention and is not intended as a limitation thereof. Unless otherwise specified, quantities are mentioned on a weight basis.

EXAMPLE I

Styrene homopolymer having a Staudinger molecular weight of approximately 55,000 is molded from a sheet in the form of a smooth, tapered cup which is approximately 4″ in height with an average cup diameter of 2¼″. The average thickness of the cup is about 10 mils.

The cup formed by the above described operation is steeped by immersing the lower or bottom portion of the cup into a medium composed of Freon (trichlorofluoromethane) maintained at a temperature of 65° F., up to within ½″ from its top peripheral edge for a period of five seconds after which the cup is withdrawn. After a fifteen second interval at a temperature of 70° F., a ring having a cooled surface such as shown in FIGURE I of the drawing is positioned against the lower portion of the cup. The ring which is cooled by the internal circulation of water, has a surface temperature of approximately 50° F. After the ring is positioned against the lower portion of the cup as shown in FIGURE I, the cup is placed against a heating device such as illustrated in FIGURE III and heated internally by a jet of air preheated to 250° F. directed inside the cup for a period of six seconds.

The resulting cup which is illustrated in FIGURE IV has a foamed outer surface extending over the area exposed to the medium except at the area enveloped by the cooled ring.

In general, the plastics used in the practice of this invention are plastic materials which have been fabricated into various shapes and include polymers such as those based on styrene, vinyl halide, vinylidene halide, vinyl acetate, cellulose acetate or butyrate, ethyl cellulose, acrylic acid esters, metacrylic acid esters, acrylonitrile, ethylene, propylene and higher olefins, isobutylene, fluorolefines and chlorofluorolefines, as well as copolymers, interpolymers, graft polymers, and chlorinated and chlorosulfonated polymers of the monomers corresponding to the above-mentioned polymeric products and mixtures of the same. A particularly useful material for forming articles such as containers is a rubber modified polystyrene or polystyrene which preferably has incorporated therein a rubber compound grafted onto the molecule.

The medium which is absorbable by the plastic is considered to be any material which is (1) absorbable by the plastic being processed and (2) convertible to a gaseous state at a temperature below the melting point temperature of the plastic. Preferably, the medium will contain or be a solvent for the plastic and may include a nonsolvent to slow the rate of absorption and/or partial solution of the plastic. For the sake of clarification, the term "solvent" also includes those materials in which the plastic is considered slightly soluble. The intent in the choice of the medium is to utilize materials which after exposure to the plastic will cause the plastic to partially foam on the subsequent application of heat.

The choice of the solvents which may be employed will depend primarily on the type of plastic material which is to be steeped, e.g., acetone or methyl ethyl ketone are suitable for the acrylonitrile-butadiene-styrene copolymers while Freon (trichlorofluoromethane) is less desirable. On the other hand, Freon is considered quite suitable for polystyrene homopolymers and rubber modified interpolymers. Among the solvents which find application in the present process there may be listed Freon (trichlorofluoromethane), methylene chloride, acetone, dichloroethylene, xylene, carbontetrachloride, methyl ethyl ketone, benzol, toluol, chloroform and the like. Among the materials which sometimes may be used as either nonsolvents or solvents depending on the type of plastic, there may be included methanol, ethanol, n-pentane, isopentane, hexane, diethylethene and the like.

The steeping operation or exposure of the plastic to the medium generally requires only a few seconds depending for the most part on the depth of foam desired, the type of medium employed, and the respective temperatures of the medium and plastic article. The steeping operation may be carried out by any suitable method such as immersion of the plastic article in a liquid medium or even by subjecting the plastic article to vapors in a vessel which may or may not be pressurized.

In general, the plastic article is permitted to dry for short intervals of time prior to the heating or foaming operation. This drying interval allows deeper diffusion and serves to increase the number of cells and decrease their size. This is considered important for good insulating properties. If desired, the drying interval may be accelerated by forced air drafts, moderate heating conditions, etc.

After the drying interval, the plastic article is then positioned against the cooled surface and heated in accordance with the practice of this invention to foam the outermost portions of the plastic article at the designated areas. The heating means utilized may vary, the final results being affected by the uniformity of heating, rate of heating and temperature level at which it is conducted. The temperature level will, of course, be above the temperature at which the medium converts from a solid or liquid state to a gaseous state. Consequently, any of the fundamental types of heat transfer, i.e., conduction, convection, and radiation may be utilized. For ease of handling, methods depending on convection are generally preferred, that is, the use of a preheated fluid or more preferably a preheated gas circulating within, around or adjacent the plastic article resulting in a heat transfer from the gas to the plastic. In the case of biaxially oriented plastics, it is sometimes desirable to support or fix the sheet dimensionally during the heating operation to avoid loss of orientation.

The products of this invention are formed from plastic materials. The structures which may be fabricated in the practice of this invention are exceptionally useful for applications requiring good insulating characteristics at defined areas and good structural properties. The products formed in the practice of this invention can be most advantageously used in dispensing or vending applications which require stacking arrangements. Where nested containers are dispensed individually from a stack, it is extremely important that the foamed portion of one cup not contact an adjacent cup if proper dispensing or stack release is to be obtained. Consequently, if a partially foamed insulating cup is employed in nested relationship for vending purposes, the area of cup foamed must be rigidly controlled.

It is obvious that many variations may be made in the products and processes set forth above without departing from the spirit and scope of this invention.

What is claimed is:

1. The method of foaming a predetermined surface area on a plastic article of manufacture which comprises exposing a surface of the plastic article to a medium absorbable by the plastic and convertible to the gaseous state at a temperature below the melting point temperature of the plastic, applying a cooled surface having a temperature at least 5° F. below the temperature at which the medium converts to the gaseous state, against a designated portion of the exposed plastic surface and simultaneously subjecting at least a portion of the remainder of the surface which was exposed to the medium the plastic article to a source of heat having a temperature below the melting point temperature of the plastic, while retaining the cooled surface in contact with said designated portion of the exposed plastic surface, to foam said portion of the remainder of the surface which was exposed to the medium.

2. The method according to claim 1 wherein the medium is a solvent for the plastic.

3. The method according to claim 1 wherein the source of heat is a preheated gas.

4. The method according to claim 1 wherein the plastic is composed of a rubber modified polystyrene.

5. The method of foaming a predetermined area on the outside of a plastic container which comprises exposing a portion of the outside surface of said container to a medium absorbable by the plastic, and convertible to the gaseous state at a temperature below the melting point temperature of the plastic, applying a cooled surface having a temperature at least 5° F. below the temperature at which the medium converts to the gaseous state, against a designated portion of said exposed outside surface and simultaneously subjecting the remainder of the container to a source of heat having a temperature below the melting point temperature of the plastic, while retaining the cooled surface in contact with said designated portion of the exposed outside surface, to foam the portion of the container previously exposed to the heating medium which is out of contact with said cooled surface.

6. The method according to claim 5 wherein the cooled surface is applied on the outside surface parallel and adjacent the lower portion of the container.

7. The method according to claim 5 wherein the plastic container is a cup.

References Cited

UNITED STATES PATENTS

| | | | |
|---|---|---|---|
| 2,262,612 | 11/1941 | Kopitke | 264—97 |
| 2,331,702 | 10/1943 | Kopitke | 264—97 |
| 2,332,930 | 10/1943 | Rina. | |
| 2,432,668 | 12/1947 | Kingston. | |
| 2,964,799 | 12/1960 | Roggi et al. | 264—167 XR |
| 3,042,972 | 7/1962 | Lafferty | 264—53 |
| 3,125,619 | 3/1964 | Miller | 264—327 XR |
| 3,127,457 | 3/1964 | Di Pinto | 264—338 XR |
| 3,144,493 | 8/1964 | Santelli | 264—51 |
| 3,171,870 | 3/1965 | Monteil et al. | 264—327 XR |
| 3,240,853 | 3/1966 | Shickman | 264—327 XR |
| 3,262,625 | 7/1966 | Russell et al. | 264—45 XR |

ALEXANDER H. BRODMERKEL, *Primary Examiner.*

P. E. ANDERSON, *Assistant Examiner.*